United States Patent
Stephan

(10) Patent No.: US 12,281,750 B2
(45) Date of Patent: Apr. 22, 2025

(54) GRIP RAIL CLAMP

(71) Applicant: PEGASUS SOLAR INC, Richmond, CA (US)

(72) Inventor: Erich Kai Stephan, Richmond, CA (US)

(73) Assignee: PEGASUS SOLAR INC, Richmond, CA (US)

( * ) Notice: Subject to any disclaimer, the term of this patent is extended or adjusted under 35 U.S.C. 154(b) by 0 days.

(21) Appl. No.: 18/098,012

(22) Filed: Jan. 17, 2023

(65) Prior Publication Data

US 2023/0228372 A1 Jul. 20, 2023

Related U.S. Application Data

(60) Provisional application No. 63/299,719, filed on Jan. 14, 2022.

(51) Int. Cl.
| | | |
|---|---|---|
| F16M 13/02 | (2006.01) | |
| F24S 25/60 | (2018.01) | |
| H02S 20/23 | (2014.01) | |

(52) U.S. Cl.
CPC ...... F16M 13/02 (2013.01); *F24S 2025/6003* (2018.05); *F24S 2025/6004* (2018.05); *F24S 2025/6005* (2018.05); *H02S 20/23* (2014.12)

(58) Field of Classification Search
CPC ....... F24S 2025/6003; F24S 2025/6004; F24S 2025/6005; F16M 13/02; H02S 20/23
See application file for complete search history.

(56) References Cited

U.S. PATENT DOCUMENTS

| | | | |
|---|---|---|---|
| 2,394,729 | A | 8/1944 | Tinnerman |
| 2,712,917 | A | 3/1951 | Flora et al. |
| 3,066,900 | A | 12/1962 | Holton |
| 3,122,604 | A | 2/1964 | Cook et al. |
| 3,145,753 | A | 8/1964 | Kreider |
| 3,966,342 | A | 6/1976 | Moriya |
| 4,159,758 | A | 7/1979 | Courson |

(Continued)

FOREIGN PATENT DOCUMENTS

| | | |
|---|---|---|
| AU | 2020287090 | 12/2021 |
| AU | 2020336321 | 2/2022 |

(Continued)

OTHER PUBLICATIONS

PCT Application No. PCT/US2023/036805, International Search Report and Written Opinion dated Apr. 2, 2024.

(Continued)

*Primary Examiner* — Eret C McNichols
(74) *Attorney, Agent, or Firm* — Polsinelli LLP

(57) ABSTRACT

Apparatuses for clamping rails and methods for rail installation are provided. A clamp apparatus may include a first grip body that includes a first groove and a second grip body that includes a second groove. Alignment of the first groove and the second groove may form a groove pair configured to couple to one or more flanges of a rail. The clamp apparatus may further include a fastener, as well as a flange spring that extends from the first grip body and that flexibly engages with the second grip body. Flexing the flange spring may allow the first grip body to move away from the second grip body along a length of the fastener.

12 Claims, 12 Drawing Sheets

(56) References Cited

U.S. PATENT DOCUMENTS

| | | | |
|---|---|---|---|
| 4,269,043 | A | 5/1981 | Kizu et al. |
| 4,285,379 | A | 8/1981 | Kowalski |
| 4,570,408 | A | 2/1986 | Frascaroli et al. |
| 4,729,706 | A | 3/1988 | Peterson et al. |
| 4,897,005 | A | 1/1990 | Peterson et al. |
| 4,907,388 | A | 3/1990 | Siahatgar |
| 4,950,841 | A | 8/1990 | Walker et al. |
| 5,144,780 | A | 9/1992 | Gieling et al. |
| 5,203,135 | A | 4/1993 | Bastian |
| D353,209 | S | 12/1994 | Dallaire et al. |
| 5,423,646 | A | 6/1995 | Gagnon |
| 5,489,173 | A | 2/1996 | Hofle |
| 5,596,237 | A | 1/1997 | Daniels |
| 5,657,604 | A | 8/1997 | Malott |
| 5,713,707 | A | 2/1998 | Gagnon |
| 6,032,939 | A * | 3/2000 | Chen .................. B25B 1/103 |
| | | | 269/251 |
| 6,086,300 | A | 7/2000 | Frohlich |
| 6,205,719 | B1 | 3/2001 | Bruce |
| 6,568,873 | B1 | 5/2003 | Peterson |
| 6,874,971 | B2 | 4/2005 | Albaugh |
| 7,077,855 | B2 | 7/2006 | Curtis |
| 7,434,362 | B2 | 10/2008 | Liebendorfer |
| 7,568,855 | B2 | 8/2009 | Fitzler et al. |
| 7,832,180 | B2 | 11/2010 | Dolby |
| 7,866,098 | B2 | 1/2011 | Cinnamon |
| 7,878,745 | B2 | 2/2011 | Allen et al. |
| 8,070,119 | B2 * | 12/2011 | Taylor ................ E04G 21/3276 |
| | | | 248/229.23 |
| 8,181,926 | B2 | 5/2012 | Magno et al. |
| 8,375,661 | B1 | 2/2013 | diGirolamo et al. |
| 8,387,319 | B1 | 3/2013 | Gilles-Gagnon et al. |
| 8,567,030 | B2 | 10/2013 | Koch et al. |
| 8,656,658 | B2 | 2/2014 | Shufflebotham |
| 8,695,290 | B1 | 4/2014 | Kim et al. |
| 8,763,321 | B1 | 7/2014 | Clemens |
| 8,893,445 | B2 | 11/2014 | Yen |
| 8,919,075 | B2 | 12/2014 | Erickson |
| 8,935,893 | B2 | 1/2015 | Liu et al. |
| 8,938,932 | B1 | 1/2015 | Wentworth et al. |
| D732,698 | S | 6/2015 | Meng |
| 9,121,433 | B1 | 9/2015 | Bacon |
| 9,181,705 | B2 | 11/2015 | Lanza |
| 9,249,813 | B2 | 2/2016 | Kalman |
| 9,267,529 | B2 | 2/2016 | Tejero Salinero |
| 9,350,288 | B2 | 5/2016 | Hardikar |
| 9,447,988 | B2 | 9/2016 | Stearns et al. |
| 9,473,066 | B2 | 10/2016 | Stephan et al. |
| 9,531,319 | B2 | 12/2016 | Braunstein et al. |
| 9,590,405 | B1 | 3/2017 | Maurer |
| 9,590,406 | B1 | 3/2017 | Maurer |
| 9,660,570 | B2 | 5/2017 | Stephan |
| 9,689,411 | B2 | 6/2017 | Meine et al. |
| 9,705,299 | B1 | 7/2017 | Maurer et al. |
| 9,819,303 | B2 | 11/2017 | Ash |
| 9,837,954 | B2 | 12/2017 | Ash |
| 9,893,677 | B1 | 2/2018 | Liu |
| 10,097,133 | B2 | 10/2018 | Aliabadi et al. |
| 10,205,418 | B2 | 2/2019 | Nayar |
| 10,211,775 | B1 | 2/2019 | Wentworth et al. |
| 10,218,305 | B1 | 2/2019 | Schrock |
| 10,270,383 | B2 | 4/2019 | Wildes et al. |
| 10,288,319 | B2 | 5/2019 | Li et al. |
| 10,305,415 | B2 | 5/2019 | McPheeters et al. |
| 10,340,838 | B2 | 7/2019 | Schuit et al. |
| 10,472,828 | B2 | 11/2019 | Stearns et al. |
| 10,749,459 | B1 | 8/2020 | Liu et al. |
| 10,847,960 | B1 | 11/2020 | Naugler et al. |
| 10,914,513 | B1 | 2/2021 | Dhage et al. |
| 11,143,436 | B1 | 10/2021 | Stephan et al. |
| 11,258,397 | B2 | 2/2022 | Von Deylen |
| 11,296,648 | B1 | 4/2022 | Jasmin et al. |
| 11,313,591 | B1 | 4/2022 | Atia |
| 11,336,222 | B1 | 5/2022 | Garza et al. |
| 11,377,840 | B2 | 7/2022 | Stephan et al. |
| 11,463,040 | B2 | 10/2022 | Affentranger, Jr. |
| 11,486,434 | B2 | 11/2022 | Kovacs et al. |
| 11,608,627 | B2 | 3/2023 | Stephan et al. |
| 11,611,310 | B2 | 3/2023 | Stephan et al. |
| 11,757,400 | B1 * | 9/2023 | Jasmin .................. H02S 20/23 |
| | | | 248/237 |
| D1,004,141 | S | 11/2023 | Stephan et al. |
| 11,811,358 | B2 | 11/2023 | Von Deylen |
| 11,848,636 | B2 | 12/2023 | Stephan et al. |
| 11,990,862 | B2 | 5/2024 | Stephan et al. |
| 12,139,905 | B2 | 11/2024 | Stephan et al. |
| 2003/0177706 | A1 | 9/2003 | Ullman |
| 2007/0248434 | A1 | 10/2007 | Wiley et al. |
| 2008/0310913 | A1 | 12/2008 | Urban et al. |
| 2009/0003961 | A1 | 1/2009 | Padfield et al. |
| 2009/0114269 | A1 | 5/2009 | Fletcher et al. |
| 2010/0202853 | A1 | 8/2010 | Merhar et al. |
| 2010/0281793 | A1 | 11/2010 | McPheeters et al. |
| 2011/0001030 | A1 | 1/2011 | Hochreiter et al. |
| 2011/0194886 | A1 | 8/2011 | Wu et al. |
| 2011/0240101 | A1 | 10/2011 | Sagayama et al. |
| 2011/0253859 | A1 | 10/2011 | Ostermeier et al. |
| 2012/0097207 | A1 | 4/2012 | Shufflebotham et al. |
| 2012/0102853 | A1 | 5/2012 | Rizzo |
| 2012/0325761 | A1 | 12/2012 | Kübsch et al. |
| 2013/0008490 | A1 | 1/2013 | Rego et al. |
| 2013/0121760 | A1 | 5/2013 | Chen et al. |
| 2013/0200234 | A1 | 8/2013 | Zhao et al. |
| 2013/0247485 | A1 | 9/2013 | Zimmerman et al. |
| 2013/0291479 | A1 | 11/2013 | Schaefer et al. |
| 2013/0299656 | A1 | 11/2013 | Kemmer et al. |
| 2014/0000681 | A1 | 1/2014 | Zhao et al. |
| 2014/0010616 | A1 | 1/2014 | Meine et al. |
| 2014/0014163 | A1 | 1/2014 | McCarthy et al. |
| 2014/0026946 | A1 | 1/2014 | West et al. |
| 2014/0042286 | A1 | 2/2014 | Jaffari |
| 2014/0079510 | A1 | 3/2014 | Suzuki et al. |
| 2014/0102517 | A1 | 4/2014 | Meine et al. |
| 2014/0154908 | A1 | 6/2014 | Magno et al. |
| 2014/0165499 | A1 | 6/2014 | Vanker et al. |
| 2014/0220834 | A1 | 8/2014 | Rizzo |
| 2014/0353435 | A1 | 12/2014 | Liu et al. |
| 2015/0034355 | A1 | 2/2015 | Patton et al. |
| 2015/0101997 | A1 | 4/2015 | Liu et al. |
| 2015/0102194 | A1 | 4/2015 | Liu |
| 2015/0129517 | A1 | 5/2015 | Wildes |
| 2015/0180404 | A1 | 6/2015 | Braunstein et al. |
| 2015/0226246 | A1 | 8/2015 | Kirchner |
| 2015/0311606 | A1 | 10/2015 | Meine et al. |
| 2015/0316086 | A1 | 11/2015 | Urban et al. |
| 2015/0357773 | A1 | 12/2015 | Schirmeier |
| 2015/0381106 | A1 | 12/2015 | Fujikawa et al. |
| 2016/0006390 | A1 | 1/2016 | Cinnamon et al. |
| 2016/0043687 | A1 | 2/2016 | McPheeters et al. |
| 2016/0069592 | A1 | 3/2016 | Giraudo et al. |
| 2016/0087576 | A1 | 3/2016 | Johansen et al. |
| 2016/0111996 | A1 | 4/2016 | Stephan et al. |
| 2016/0156169 | A1 | 6/2016 | Jaena et al. |
| 2016/0226432 | A1 | 8/2016 | Almy et al. |
| 2016/0233820 | A1 | 8/2016 | Redel |
| 2016/0248367 | A1 | 8/2016 | Almy et al. |
| 2016/0268958 | A1 | 9/2016 | Wildes et al. |
| 2016/0282018 | A1 | 9/2016 | Ash et al. |
| 2016/0285408 | A1 | 9/2016 | Ash et al. |
| 2016/0329671 | A1 | 11/2016 | Kokenda et al. |
| 2017/0033730 | A1 | 2/2017 | Almy et al. |
| 2017/0063301 | A1 | 3/2017 | Ash |
| 2017/0093327 | A1 | 3/2017 | Stephan et al. |
| 2017/0133977 | A1 | 5/2017 | Tripp et al. |
| 2017/0146041 | A1 | 5/2017 | Schaefer et al. |
| 2017/0170579 | A1 | 6/2017 | Martin |
| 2017/0201080 | A1 | 7/2017 | Maurer et al. |
| 2017/0233996 | A1 | 8/2017 | Abernathy et al. |
| 2017/0237386 | A1 | 8/2017 | Stephan et al. |
| 2017/0366131 | A1 | 12/2017 | Stearns et al. |
| 2018/0062561 | A1 | 3/2018 | Kapla et al. |
| 2018/0076605 | A1 | 3/2018 | Garcia |
| 2018/0091091 | A1 | 3/2018 | Rossi |
| 2018/0094418 | A1 | 4/2018 | Winter |

(56) References Cited

U.S. PATENT DOCUMENTS

| | | | |
|---|---|---|---|
| 2018/0245331 A1 | 8/2018 | Tang et al. | |
| 2018/0316307 A1 | 11/2018 | Martin | |
| 2018/0342974 A1 | 11/2018 | Jasmin et al. | |
| 2018/0367093 A1 | 12/2018 | Ayers et al. | |
| 2019/0013772 A1 | 1/2019 | Bamat et al. | |
| 2019/0049151 A1 | 2/2019 | Harris et al. | |
| 2019/0068110 A1 | 2/2019 | McPheeters | |
| 2019/0154306 A1 | 5/2019 | Rothschild | |
| 2019/0178274 A1 | 6/2019 | Katz | |
| 2019/0211543 A1 | 7/2019 | Abernathy et al. | |
| 2019/0264452 A1 | 8/2019 | Cangelosi | |
| 2019/0326847 A1 | 10/2019 | Zuritis | |
| 2020/0056370 A1 | 2/2020 | Hebiishi et al. | |
| 2020/0313604 A1 | 10/2020 | Harris et al. | |
| 2020/0389122 A1 | 12/2020 | Stephan | |
| 2020/0403559 A1 | 12/2020 | Kresse et al. | |
| 2021/0058023 A1 | 2/2021 | Bamat et al. | |
| 2021/0067083 A1 | 3/2021 | Stephan | |
| 2021/0156135 A1 | 5/2021 | Stephan et al. | |
| 2021/0156413 A1 | 5/2021 | Stephan et al. | |
| 2021/0194158 A1 | 6/2021 | Ash et al. | |
| 2021/0222421 A1 | 7/2021 | Meine | |
| 2021/0242821 A1 | 8/2021 | MacDonald et al. | |
| 2021/0285689 A1* | 9/2021 | Affentranger, Jr. | H02S 30/00 |
| 2021/0310513 A1 | 10/2021 | Feldmann et al. | |
| 2022/0077815 A1 | 3/2022 | Wentworth et al. | |
| 2022/0173692 A1* | 6/2022 | Schuit | H02S 20/30 |
| 2022/0190781 A1 | 6/2022 | Stephan | |
| 2022/0216821 A1 | 7/2022 | Harris et al. | |
| 2022/0239247 A1 | 7/2022 | Stephan | |
| 2022/0263458 A1 | 8/2022 | Stephan | |
| 2022/0298776 A1 | 9/2022 | Stephan | |
| 2022/0345074 A1* | 10/2022 | Neal | F24S 25/65 |
| 2022/0407449 A1 | 12/2022 | Lepley et al. | |
| 2023/0178904 A1 | 6/2023 | Stephan et al. | |
| 2023/0204972 A1 | 6/2023 | Wu et al. | |
| 2023/0287674 A1 | 9/2023 | Stephan et al. | |
| 2024/0060598 A1 | 2/2024 | Wogan et al. | |
| 2024/0154570 A1 | 5/2024 | Stephan et al. | |
| 2024/0171116 A1 | 5/2024 | Stephan et al. | |
| 2024/0263842 A1 | 8/2024 | Stephan | |
| 2025/0003208 A1 | 1/2025 | Stephan et al. | |
| 2025/0055408 A1 | 2/2025 | Stephan | |

FOREIGN PATENT DOCUMENTS

| | | |
|---|---|---|
| AU | 2022405369 | 5/2024 |
| CA | 3239051 | 6/2023 |
| CN | 110454997 | 11/2019 |
| DE | 202012012830 | 1/2014 |
| EP | 2239783 | 10/2010 |
| EP | 008534556-0001 | 10/2021 |
| EP | 3981029 | 4/2022 |
| EP | 4013970 | 6/2022 |
| EP | 4022765 | 7/2022 |
| EP | 4066283 | 10/2022 |
| EP | 4214832 | 7/2023 |
| EP | 4237637 | 9/2023 |
| EP | 4419758 | 8/2024 |
| HK | 40074229 | 12/2022 |
| HK | 40080613 | 5/2023 |
| JP | 2011117168 | 6/2011 |
| JP | 2011127330 | 6/2011 |
| JP | 2013177778 | 9/2013 |
| JP | 5520544 | 6/2014 |
| JP | 2015059366 | 3/2015 |
| MX | 2022/001475 A | 3/2022 |
| MX | 2022004556 A | 5/2022 |
| MX | 64445 | 6/2022 |
| MX | 2024006899 | 6/2024 |
| WO | WO 2020/247463 | 12/2020 |
| WO | WO 2021/041408 | 3/2021 |
| WO | WO 2021/108492 | 6/2021 |
| WO | WO 2021/108696 | 6/2021 |
| WO | WO 2021/119458 | 6/2021 |
| WO | WO 2022/132135 | 6/2022 |
| WO | WO 2022/159122 | 7/2022 |
| WO | WO 2023/107563 | 6/2023 |
| WO | WO 2023/107569 | 6/2023 |
| WO | WO 2024/039912 | 2/2024 |
| WO | WO 2024/097416 | 5/2024 |
| WO | WO 2024/168100 | 8/2024 |
| WO | WO 2025/034927 | 2/2025 |

OTHER PUBLICATIONS

European Patent Office, Application No. 20891880.5, European Search Report dated Mar. 14, 2024.
U.S. Appl. No. 18/109,814, Office Action mailed Mar. 15, 2024.
U.S. Appl. No. 17/102,749, Office Action mailed Apr. 12, 2024.
PCT Application No. PCT/US2020/035874, International Preliminary Report on Patentability dated Dec. 7, 2021.
PCT Application No. PCT/US2020/035874, International Search Report and Written Opinion dated Aug. 18, 2020.
PCT Application No. PCT/US2020/047792, International Preliminary Report on Patentability dated Mar. 1, 2022.
PCT Application No. PCT/US2020/047792, International Search Report and Written Opinion dated Nov. 9, 2020.
PCT Application No. PCT/US2020/065160, International Search Report and Written Opinion dated Apr. 20, 2021.
PCT Application No. PCT/US2020/062151, International Preliminary Report on Patentability dated May 17, 2022.
PCT Application No. PCT/US2020/062151, International Search Report and Written Opinion dated Feb. 17, 2021.
PCT Application No. PCT/US2020/062406, International Preliminary Report on Patentability dated May 17, 2022.
PCT Application No. PCT/US2020/062406, International Search Report and Written Opinion dated Mar. 30, 2021.
PCT Application No. PCT/US2021/020708, International Search Report and Written Opinion dated Jul. 21, 2021.
PCT Application No. PCT/US2022/052152, International Search Report and Written Opinion dated Mar. 28, 2023.
European Patent Office, Application No. 20893136.0, European Search Report dated Aug. 2, 2023, 5 pages.
European Patent Office, Application No. 20819161.9, European Search Report dated Apr. 20, 2023, 4 pages.
U.S. Appl. No. 16/889,635, Office Action mailed Mar. 17, 2023.
U.S. Appl. No. 16/889,635, Final Office Action mailed Nov. 4, 2022.
U.S. Appl. No. 16/889,635, Office Action mailed Sep. 28, 2022.
U.S. Appl. No. 17/001,357, Office Action mailed Jun. 3, 2022.
U.S. Appl. No. 17/120,534, Office Action mailed May 26, 2021.
U.S. Appl. No. 17/118,771, Final Office Action mailed Nov. 7, 2022.
U.S. Appl. No. 17/118,771, Office Action mailed Aug. 11, 2022.
U.S. Appl. No. 17/155,624 Office Action mailed May 26, 2022.
U.S. Appl. No. 17/834,774 Office Action mailed Nov. 10, 2022.
U.S. Appl. No. 17/672,567 Office Action mailed Jun. 30, 2023.
U.S. Appl. No. 18/109,814 Office Action mailed Sep. 14, 2023.
U.S. Appl. No. 17/102,749 Office Action mailed Sep. 15, 2023.
U.S. Appl. No. 16/889,635, Final Office Action mailed May 17, 2023.
U.S. Appl. No. 17/118,771, Office Action mailed Feb. 12, 2024.
U.S. Appl. No. 17/118,771, Final Office Action mailed Oct. 10, 2023.
U.S. Appl. No. 17/102,749 Final Office Action mailed Dec. 29, 2023.
PCT/US2020/065160, Erich Kai Stephan, Hidden End Clamp, Dec. 15, 2020.
AU 2020336321, Erich Kai Stephan, Kit of Cross-Compatible Parts for Multiple Solar Installation Methods, Jan. 7, 2022.
EP 20857031.7, Erich Kai Stephan, Kit of Cross-Compatible Parts for Multiple Solar Installation Methods, Jan. 25, 2022.
MX/a/2022/001475, Erich Kai Stephan, Kit of Cross-Compatible Parts for Multiple Solar Installation Methods, Feb. 22, 2022.
HK62022063342.9, Erich Kai Stephan, Kit of Cross-Compatible Parts for Multiple Solar Installation Methods, Nov. 3, 2022.
PCT/US2021/020708, Erich Kai Stephan, Hinged Solar Mount, Mar. 3, 2021.

(56) References Cited

OTHER PUBLICATIONS

EP21921576.1, Erich Kai Stephan, Hinged Solar Mount, May 31, 2023.
PCT/US2020/062406, Erich Kai Stephan, One-Piece Bonding Splice for Rails, Nov. 25, 2020.
EP 20891880.5, Erich Kai Stephan, One-Piece Bonding Splice for Rails, May 6, 2022.
HK62023069412.2, Erich Kai Stephan, One-Piece Bonding Splice for Rails, Mar. 2, 2023.
EP 8534556, Erich Kai Stephan, Rail, May 10, 2021.
MX/f/2021/001551, Erich Kai Stephan, Rail, May 27, 2021.
PCT/US2020/035874, Erich Kai Stephan, Skip Rail System, Jun. 3, 2020.
AU 2020287090, Erich Kai Stephan, Skip Rail System, Nov. 10, 2021.
EP 20819161.9, Erich Kai Stephan, Skip Rail System, Nov. 25, 2021.
PCT/US2020/062151, Erich Kai Stephan, Twist-Lock Solar Module Clamp, Nov. 25, 2020.
EP 20893136.0, Erich Kai Stephan, Twist-Lock Solar Module Clamp, Mar. 17, 2022.
MX/a/2022/004556, Erich Kai Stephan, Twist-Lock Solar Module Clamp, Apr. 13, 2022.
PCT/US2022/052152, Erich Kai Stephan, Rail Splice with Interference Features, Dec. 7, 2022.
U.S. Appl. No. 18/435,927, Erich Kai Stephan, Tilt Leg System for Solar Panel Arrays, filed Feb. 7, 2024.
PCT/US2024/014904, Erich Kai Stephan, Tilt Leg System for Solar Panel Arrays, Feb. 7, 2024.
U.S. Appl. No. 18/386,912, Erich Kai Stephan, Module Coupling Clamp, filed Nov. 3, 2023.
PCT/US2023/036805, Erich Kai Stephan, Module Coupling Clamp, Nov. 3, 2023.
PCT/US2023/030741, Ian Wogan, Rood Attachment With Integrated Sealant, Aug. 21, 2023.
PCT Application No. PCT/US2023/030741, International Search Report and Written Opinion dated Jan. 17, 2024.
PCT Application No. PCT/US2020/065160, International Preliminary Report on Patentability dated Jun. 29, 2023.
European Patent Office, Application No. 20966131.3, Partial Supplementary European Search Report dated Sep. 24, 2024.
European Patent Office, Application No. 21921576.1, Partial Supplementary European Search Report dated Sep. 4, 2024.
European Patent Office, Application No. 20857031.7, Extended European Search Report dated Aug. 23, 2023.
U.S. Appl. No. 17/103,682, Final Office Action dated Nov. 12, 2021.
U.S. Appl. No. 17/103,682, Office Action dated Jun. 9, 2021.
PCT Application No. PCT/US2024/014904, International Search Report and Written Opinion dated May 20, 2024.
U.S. Appl. No. 18/886,818, Erich Kai Stephan, One-Piece Bonding Splice for Rails, filed Sep. 16, 2024.
U.S. Appl. No. 90/019,642, Erich Kai Stephan, Skip Rail System, filed Aug. 30, 2024.
EP 23855544.5, EP, Ian Wogan, Roof Attachment With Integrated Sealant, Dec. 2, 2024.
Definition of "Splice", Cambridge English Dictionary, https:/dictionary.cambridge.org/us/dictionary/english/splice downloaded Jul. 22, 2024.
PCT Application No. PCT/US2021/020708, International Preliminary Report on Patentability dated Aug. 3, 2023.
PCT Application No. PCT/US2022/052152, International Preliminary Report on Patentability and dated Jun. 20, 2024.
US. Reexamination Application No. 90/019,642, Request for Ex Parte Reexamination of U.S. Pat. No. 11,848,636 filed Aug. 30, 2024.
PCT Application No. PCT/US2024/041375, International Search Report and Written Opinion dated Oct. 9, 2024.
Australian Application No. 2020287090, Examination Report No. 1 dated Feb. 7, 2025.
European Patent Office, Application No. 20966131.3, Extended European Search Report dated Dec. 17, 2024.
European Patent Office, Application No. 21921576.1, Extended European Search Report dated Dec. 16, 2024.

* cited by examiner

GRIP RAIL CLAMP

CROSS-REFERENCE TO RELATED APPLICATIONS

The present patent application claims the priority benefit of U.S. provisional patent application No. 63/299,719 filed Jan. 14, 2022, the disclosure of which is incorporated by reference herein.

BACKGROUND OF THE INVENTION

Current rooftop solar arrays are supported using a series of beams, often called rails. These rails are secured to roof attachments via either a bolt connection or a slidable clamp. Both of these methods can incur additional costs in manufacturing that prevent a solar installation system from being economical. The present invention demonstrates a more cost-efficient mechanism to clamp a rail to a roof attachment.

SUMMARY OF THE CLAIMED INVENTION

Embodiments of the present invention include apparatuses for clamping rails and methods for rail installation. A clamp apparatus may include a first grip body that includes a first groove and a second grip body that includes a second groove. Alignment of the first groove and the second groove may form a groove pair configured to couple to one or more flanges of a rail. The clamp apparatus may further include a fastener, as well as a flange spring that extends from the first grip body and that flexibly engages with the second grip body. Flexing the flange spring allows the first grip body to move away from the second grip body along a length of the fastener.

Methods for rail installation may include aligning a first grip body that includes a first groove to a second grip body that includes a second groove so as to form a groove pair configured to couple to one or more flanges of a rail, fastening the first grip body in alignment to the second grip body using a fastener that extends laterally through at least one of the first grip body and the second grip body, and applying downward pressure to a rail positioned above the groove pair. The downward pressure may flex a flange spring that extends from the first grip body and that flexibly engages with the second grip body, which may allow the first grip body to move away from the second grip body along a length of the fastener. The flanges of the rail may then be captured by the groove pair as the first grip body moves back toward the second grip body when the flange spring is released.

BRIEF DESCRIPTION OF THE DRAWINGS

In order to describe the manner in which the above-recited and other advantages and features of the disclosure can be obtained, a more particular description of the principles briefly described above may be rendered by reference to specific embodiments thereof which are illustrated in the appended drawings. Understanding that these drawings depict only exemplary embodiments of the disclosure and are not therefore to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art may recognize that other components and configurations may be used without parting from the spirit and scope of the disclosure.

Embodiments of the present invention include apparatuses for clamping rails and methods for rail installation. A clamp apparatus may include a first grip body that includes a first groove and a second grip body that includes a second groove. Alignment of the first groove and the second groove may form a groove pair configured to couple to one or more flanges of a rail. The clamp apparatus may further include a fastener, as well as a flange spring that extends from the first grip body and that flexibly engages with the second grip body. Flexing the flange spring allows the first grip body to move away from the second grip body along a length of the fastener.

Figure 1:
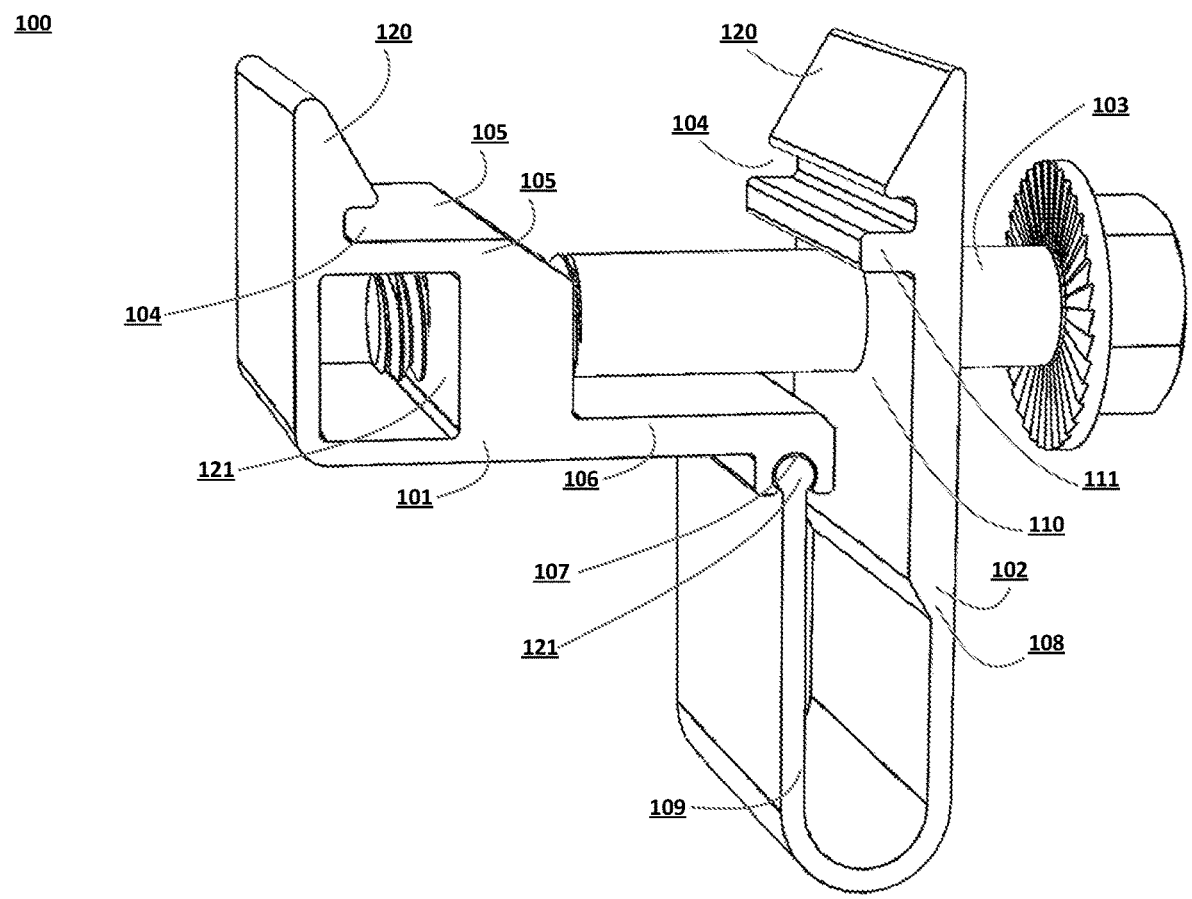
FIG. 1 depicts an isometric view of an exemplary rail clamp.

FIG. 1 depicts an isometric view representing an example embodiment of the present invention. Rail clamp 100 may be comprised of an arm grip 101, a base grip 102, and a fastener 103. The arm grip 101 may have a barb feature 120 extending from an upper surface 105, and the barb feature 120 and upper surface 105 may form parts of a groove 104. Below the upper surface 105, a threaded aperture 121 may be provided with internal threads that traverse laterally through a wall of the arm grip 101 and engage with a fastener 103 having external threads corresponding to the internal threads of threaded aperture 121. In some embodiments, the wall of the arm grip 101 may be parallel to another wall that may extend from the barb feature 120. The arm grip 101 may also have a connecting flange 106 that traverses laterally from the wall with the threaded aperture 121 and that includes a connection feature 107 at its distal end.

The base grip 102 may have a similar barb feature 120 and a support flange 111 each extending laterally to form the groove 104. The base grip 102 may have a flange 108 extending downwards and formed into a "u" shape portion extending back upwards to create a flange spring 109. The flange spring 109 may have a different thickness or may be the same thickness as flange 108. An aperture 110 may extend through the flange 108 to allow a fastener 103 to pass through. The aperture 110 may be tangent to the underside of the support flange 111 as shown, or may traverse through the support flange 111 and be tangent to the lower surface of the groove 104.

Figure 2:
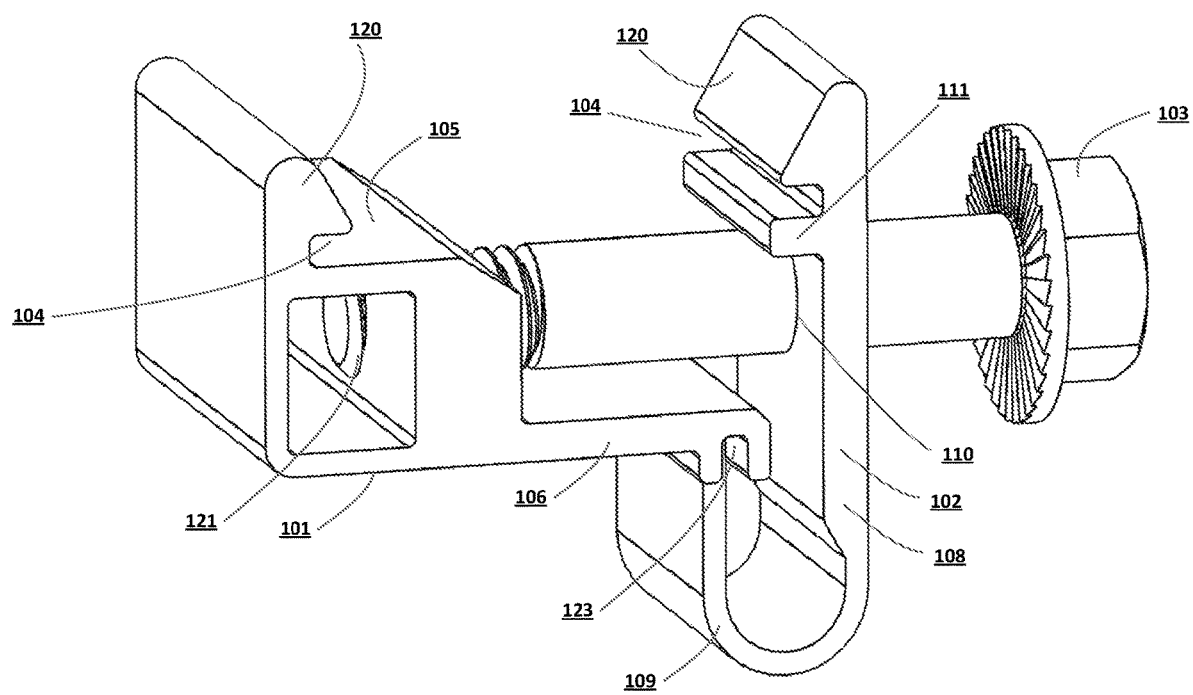
FIG. 2 depicts an isometric view of an alternative rail clamp installed on a roof attachment with a rail positioned overhead.
Figure 3A:
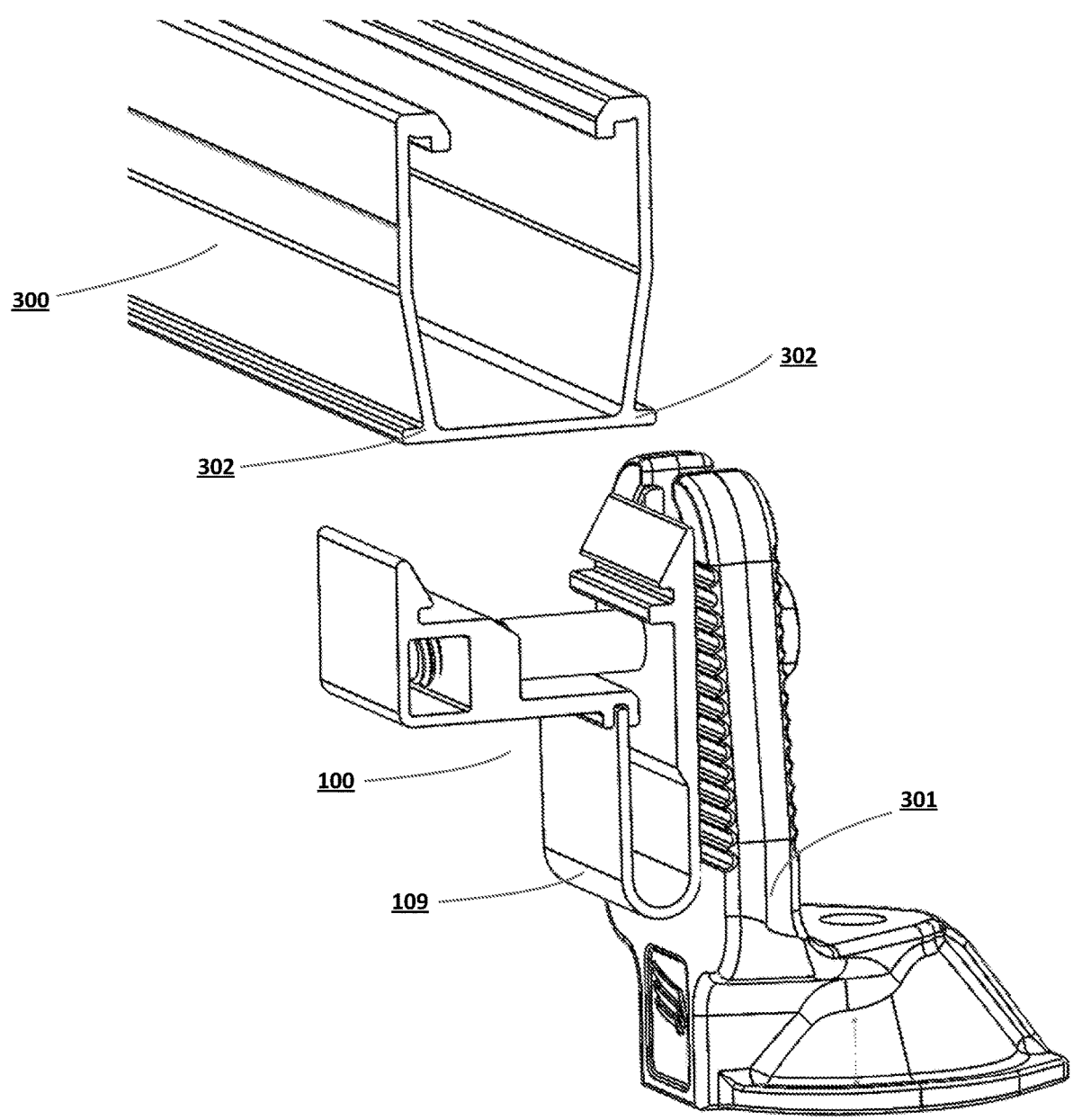
FIG. 3A-3D depict an exemplary sequence of stages during which a rail is installed into the rail clamp of FIG. 2.
Figure 3B:
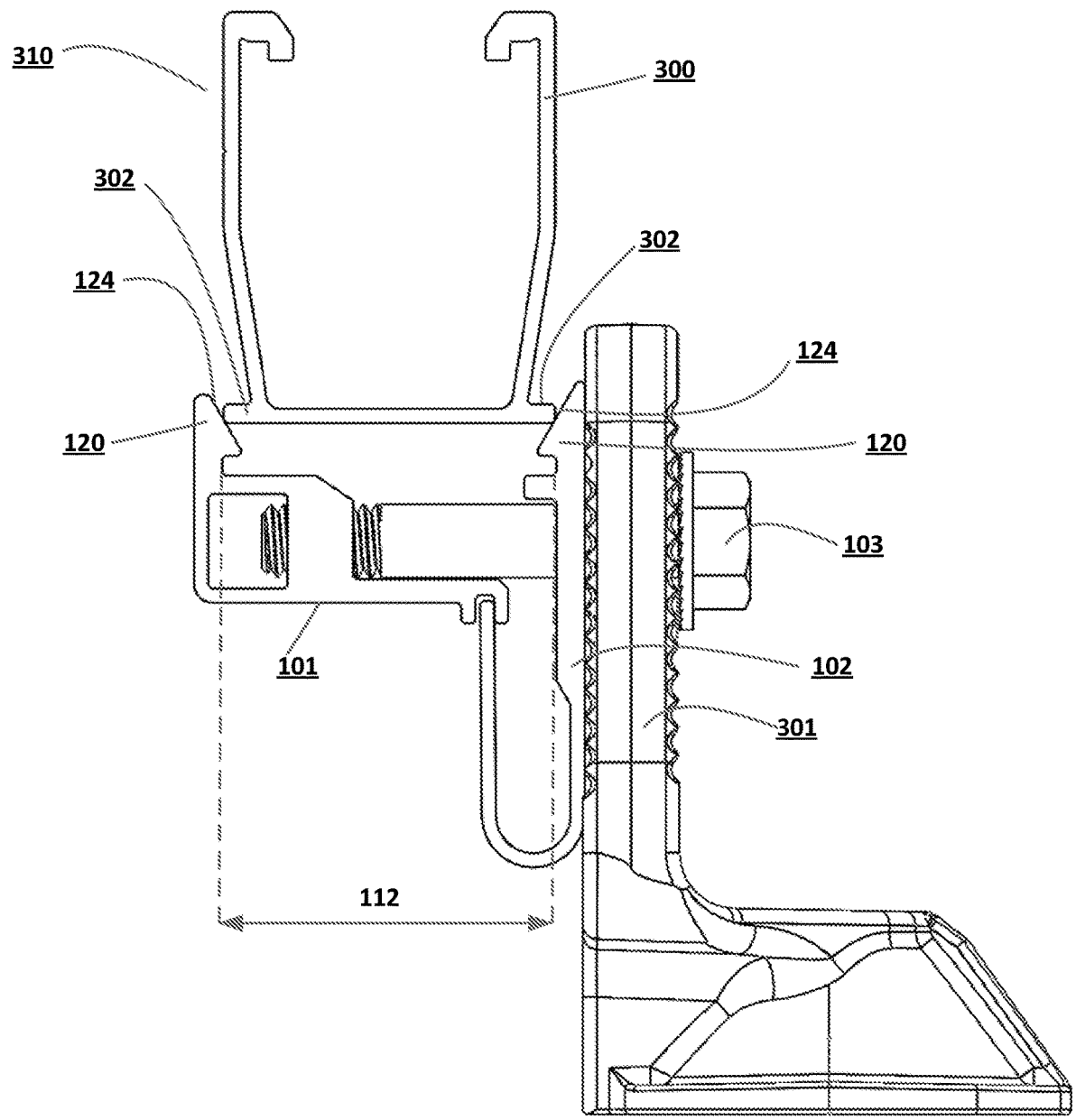

As depicted, arm grip 101 and base grip 102 may have a complex geometry when viewed from the end (such as illustrated in FIG. 3B). Such geometry may include a uniform cross-section along an entire length of the respective component, excluding one or more portions that may include one or more apertures (e.g., perpendicularly disposed apertures for fastener 103). Arm grip 101 and base grip may have the same length along the complex geometry, or may have different lengths, as depicted in FIG. 2. Arm grip 101 and base grip 102 may each be manufactured from aluminum using an extrusion process, or may be made from a stamping, injection molding, die cast, or other suitable methods.

The fastener 103 may have a serrated flanged hex head, a non-serrated flange hex head, a flanged socket cap screw, or another common fastener configuration. In various embodiments, the fastener 103 may consist of a fully or partially threaded rod that may be secured to the threaded aperture 121 of arm grip 101, with a nut on the far distal end, e.g. where the head of the depicted fastener 103 is located. In this example embodiment, the nut may be removed so the fastener 103 can be easily installed through an aperture of a roof attachment 301, and then the nut could be re-attached onto the fastener 103 to secure the rail clamp 100 in place.

Assembling the rail clamp 100 from arm grip 101, base grip 102, and fastener 103 includes passing the fastener 103 through the aperture 110 of base grip 102. The threaded section of the fastener 103 engages with the threaded aperture 121 in the arm grip 101. When paired and aligned, the grooves 104 of the arm grip 101 and base grip 102 are substantially planar to one another (e.g., whereby groove 104 of arm grip 101 has one or more surfaces that are co-planar with corresponding surfaces of groove 104 of base grip 102) once fastener 103 is positioned through both the aperture 110 and threaded aperture 121. The connection feature 107 may engage with the distal end of the flange spring 109 via a ball joint 122 as shown in FIG. 1, a tongue joint 123 as shown in FIG. 2, or other type of joint or hinge. Once assembled, the arm grip 101 and base grip 102 may form a nominal grip distance 112 between the respective grooves 104 when flange spring 111 is unflexed. In the nominal (unflexed) state, the flange spring 111 may not be under any compressive or tensile forces. In other embodiments not shown, the flange spring 109 may be formed onto the arm grip 101 and couple with a connection feature 107 on the end of the flange 108.

As used herein, "groove" may be generally used to refer to a portion of a clamp configured to secure one or more parts of a rail. Such portion may include any combination of grooves, depressions, cuts, tracks, protrusions, etc., that correspond to a shape of the rail (or rail part). For example, FIGS. 1 and 2 illustrate a groove 104 having a shape and size corresponding to a shape and size of rail flanges 302 so as to allow for insertion of the rail flanges 302 into the groove 104 from which the rail can be held securely in place.

FIGS. 3A-3D depict an installation sequence of a rail 300 attaching to a rail clamp 100. Rail 300 may have rail flanges 302 which extend laterally from either side of the rail 300 away from the center of rail 300. Rail flanges 302 may be substantially rectangular (as shown) or may be tapered. The rail flanges 302 may be dimensioned to loosely fit within the grooves 104 or have tapered surfaces to create a jam-fit when the arm grip 101 and base grip 102 are compressed towards one another. In some embodiments, the grooves 104 may likewise be tapered in a manner corresponding to fit around rail flanges 302.

The rail flanges 302 may protrude from an undercut space so an outside edge of the rail flange 302 is substantially co-planar with an outside wall of the rail 300 as shown. The rail flanges 302 may thus extend out to be substantially coincident with the outside surface of the rail 310. Rail 300 may also have flanges on the upper distal ends that protrude into the center of the rail 300 with underside grooves formed therein.

FIG. 3A depicts an isometric view of rail clamp 100 attached onto a roof attachment 301. Rail 300 is positioned above the rail clamp 100, and the flange spring 109 is in a nominal (unflexed) state. FIG. 3B depicts an end view of the next stage in which the rail 300 is placed upon the incline surfaces 124 on the barb feature 120s that form above the pair of grooves 104.

Figure 3C:
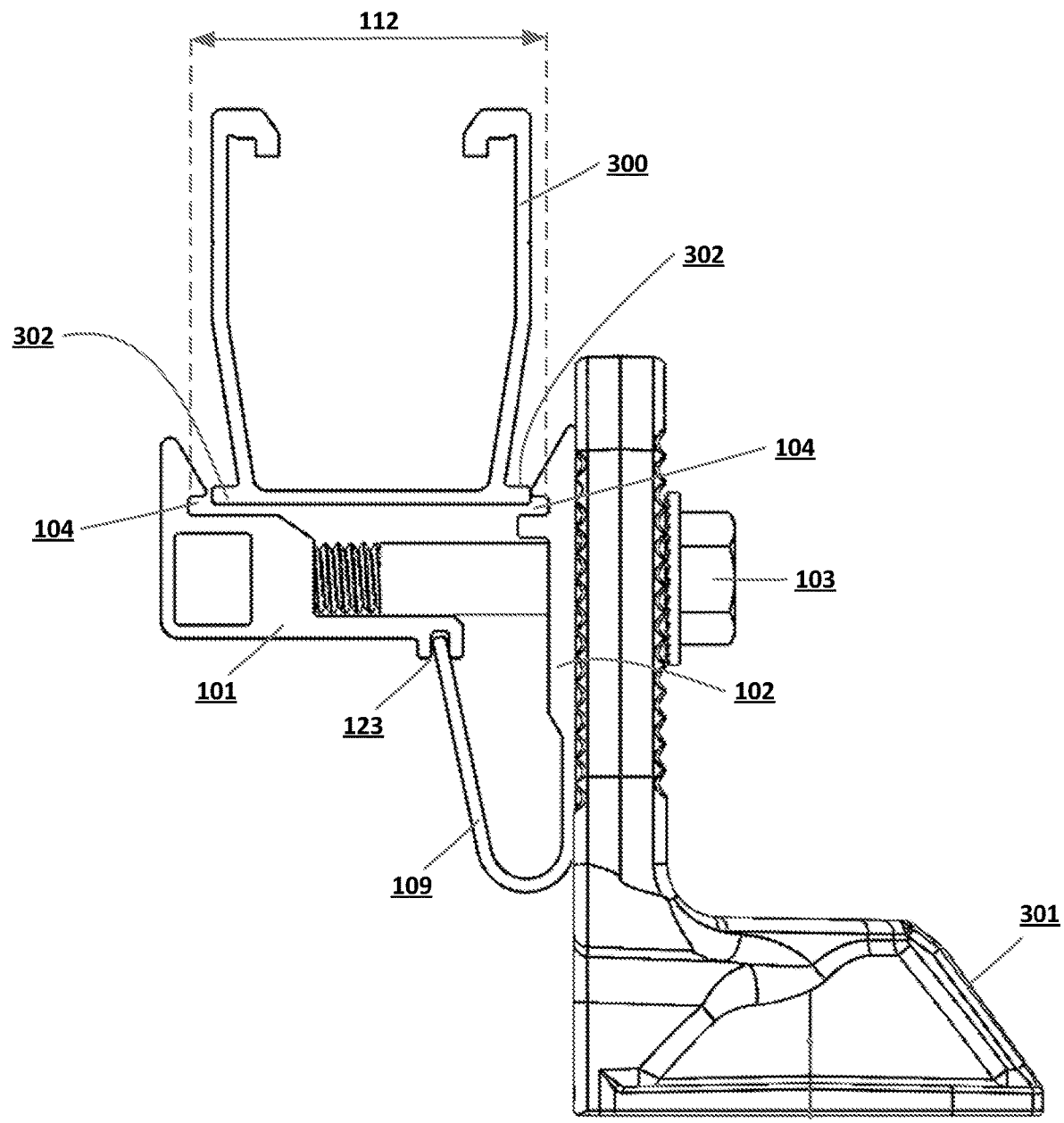

FIG. 3C depicts a stage in which a downward pressure may be applied to the rail 300, resulting into a tensile force in the flange spring 109 and a lateral force on the incline surfaces 124. Thus, the arm grip 101 is forced to move laterally away from the base grip 102 along the length of the fastener 103. Grip distance 112 is greater in this flexed state than in the nominal state depicted in FIG. 3B. The increasing grip distance 112 allows the rail flanges 302 to traverse down the inclined surfaces, past the distal points of the barb features 120 (as shown), and towards substantially alignment within the pair of aligned grooves 104.

Figure 3D:
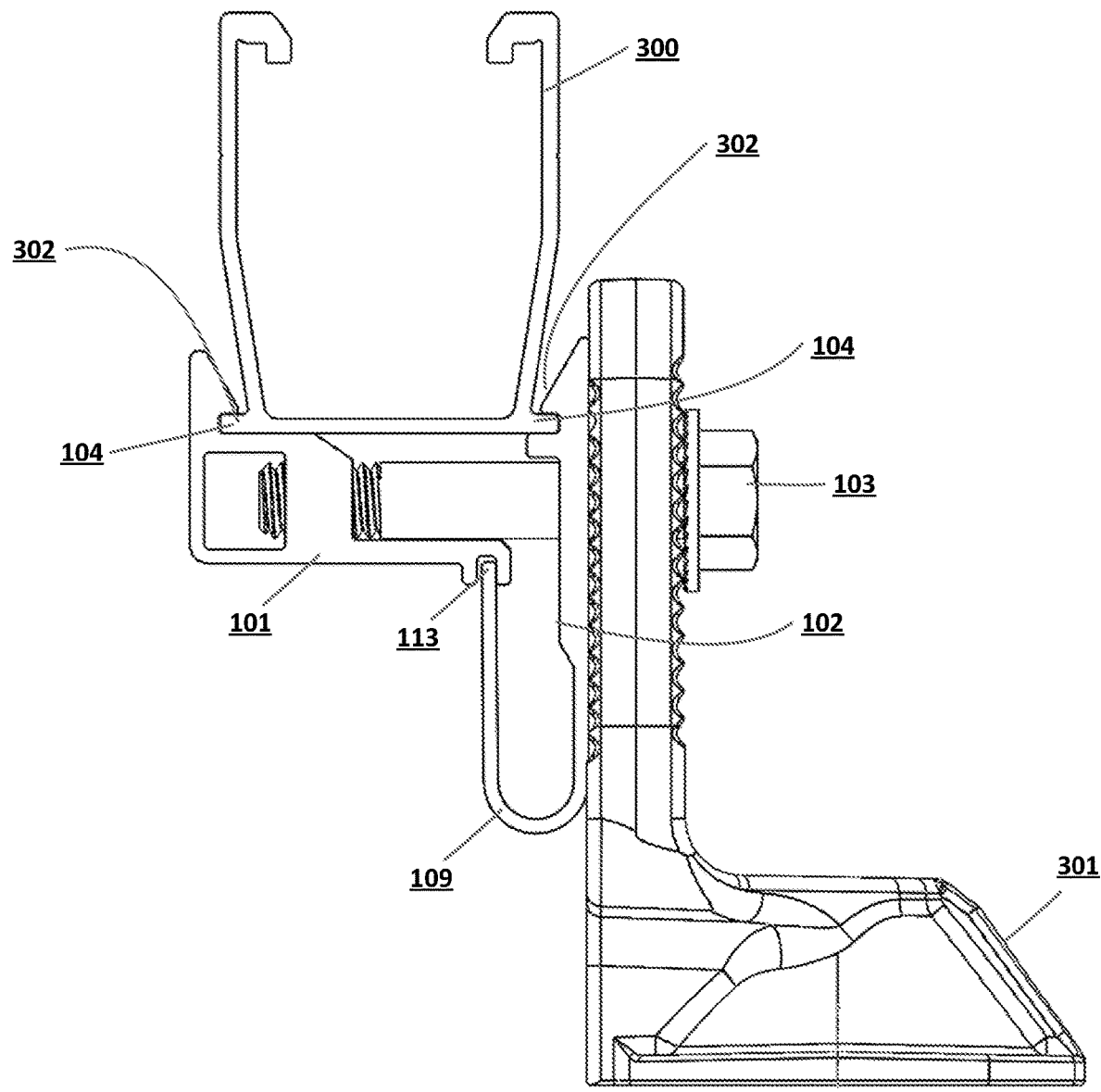

In the stage illustrated in FIG. 3D, the rail 300 is now clamped within the rail clamp 100 after having been pushed down far enough such that the rail flanges 302 are substantially aligned with the grooves 104. The potential energy stored in the flange spring 109 in a flexed state has been released to pull the arm grip 101 back along the length of the fastener 103 towards the base grip 102, which results in capture of the rail flanges 302 within the grooves 104 when the flange spring 109 is in its nominal state. A joint (e.g., ball joint 122 of FIG. 1 or tongue joint 123 of FIG. 2) enables the arm grip 101 to traverse laterally along the length of the fastener 103 without inducing a moment force on the distal end of the flange spring 109. When the rail flanges 302 reside in the grooves 104, the flange spring 109 may be in a nominal state, or may retain some potential energy in order to apply a desired lateral compression between the arm grip 101 and base grip 102 onto rail flanges 302. The flange spring 109 may be shaped and dimensioned to allow the rail 300 to slide through the rail clamp 100 with moderate hand pressure (e.g., out of the page towards the viewer or into the page away from the viewer in FIG. 3D) while providing a desired level of friction so as to resist sliding. Once the rail 300 is in its clamped position in which the rail flanges 302 are sitting within the grooves 104, the fastener 103 may be tightened to secure the rail 300 to the rail clamp 100 and roof attachment 301.

Figure 4A:
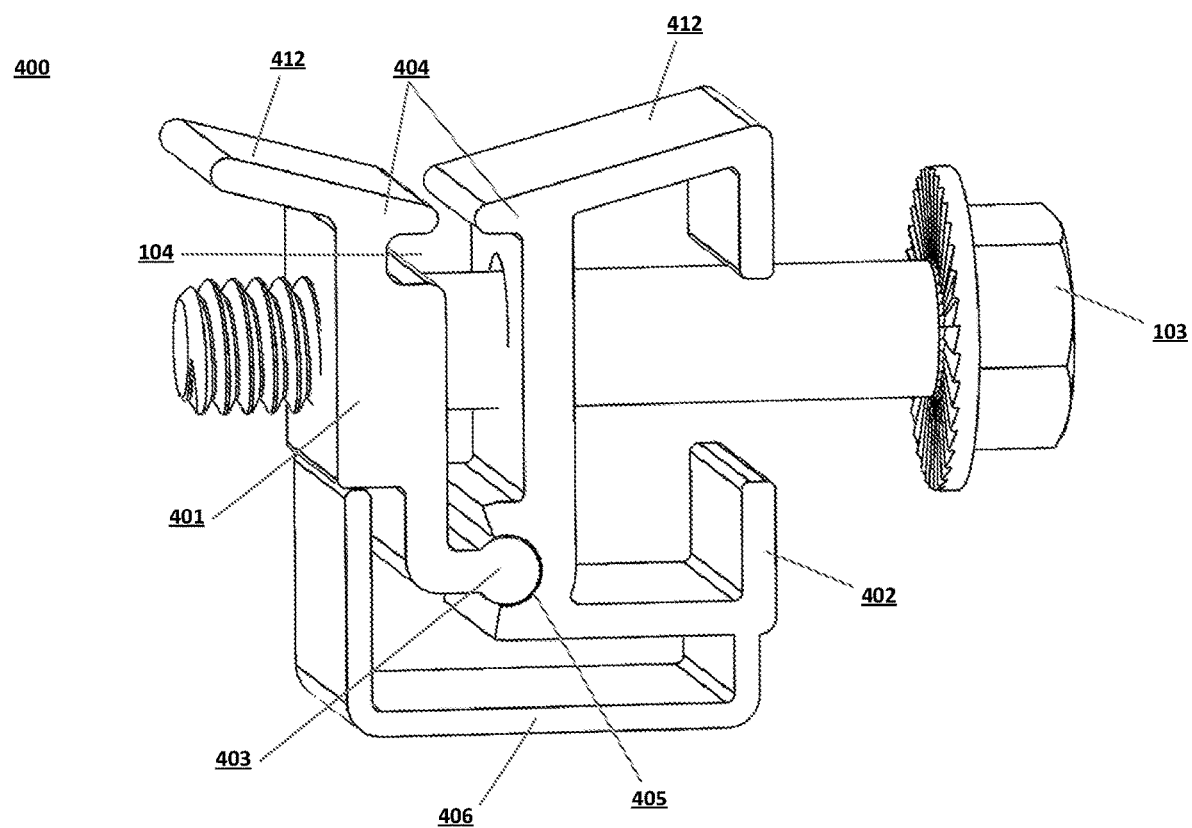
FIG. 4A-4B depict isometric views of yet another alternative rail clamp.
Figure 4B:
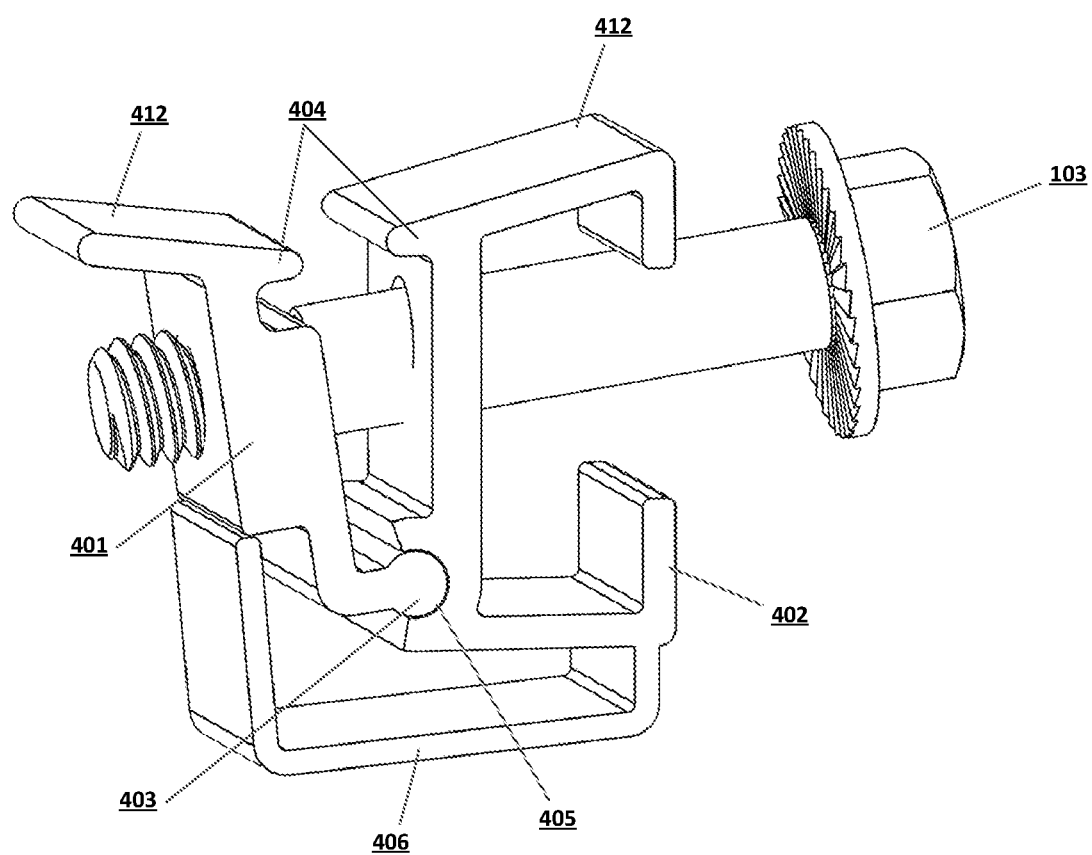

FIGS. 4A and 4B depict an alternative embodiment of the present invention. FIG. 4A depicts an arm grip 401, base grip 402, and fastener 103. Arm grip 401 has an inclined surface 412 that extends to form a lip 404 at the lower distal end. At the lower portion of the arm grip 401 is a ball joint 403. Base grip 402 has a similar inclined surface 412 forming a lip 404 at its lower end. Base grip 402 has a socket 405 at its lower end designed to cooperate with the ball joint 403. Base grip 402 also has a flange spring 406 that extends from a bottom right corner of the base grip 402 to a far side of the arm grip 401. Arm grip 401 has a threaded aperture to engage with a fastener 103. In FIG. 4A, the flange spring 406 is in a nominal, non-compressed state, thereby supporting the arm grip 401 in a position such that the upper surface of the groove 104 and underside surface of the lip 404 are substantially co-planar.

FIG. 4B depicts the arm grip 401 rotated around the ball joint 403, thereby increasing the size of the opening distance between the respective inclined surfaces and lips of arm grip and base grip, and putting the flange spring 406 in a compressed state. Similar to the rail clamps 100 of FIGS. 1 and 2, the compressed state and associated increase in opening distance allows for a rail to be installed into the groove 104 and to be secured within the groove 104 when the compressed state is released to bring the arm grip and base grip closer together (e.g., whereby the opening distance may be decreased).

FIGS. 5A through 5D depict an installation sequence of a rail 409 installing into a rail clamp 400. In this example embodiment, rail 409 has a central "T" shaped protrusion, a T-flange 410, running along length of the rail 409 on the central underside. The angled lower surfaces of the rail 409 are parallel to the inclined surfaces 412 of the rail clamp 400 when the rail clamp 400 is in a nominal state. Inside the rail 409, a cross support 411 may extend partially or fully across the width of the angled lower surfaces. A gap between the lower angled surfaces and the upper surface of the T-flange 410 are dimensioned so the inclined surfaces 412 may result in jam-fit when engaged.

Figure 5A:
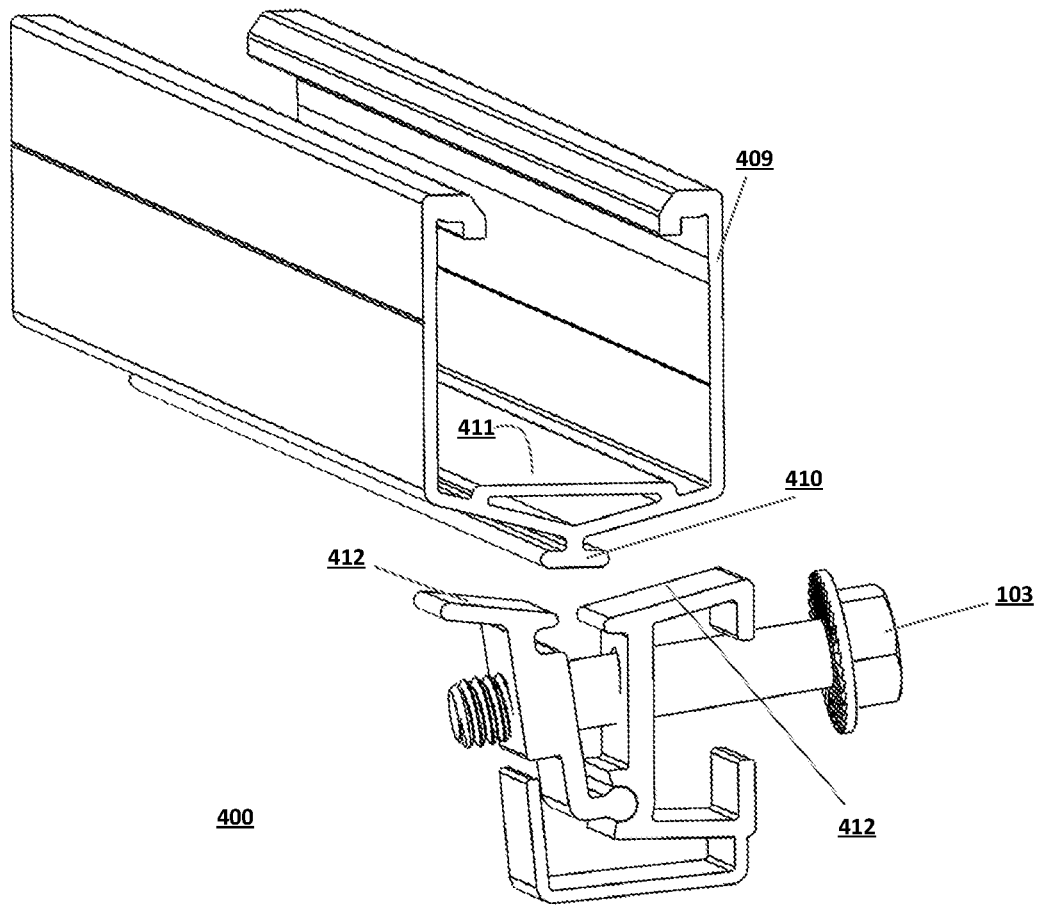
FIG. 5A-5D depict an exemplary sequence of stages during which a rail is installed into the rail clamp of FIGS. 4A-4B.

FIG. 5A depicts a rail 409 position above a rail clamp 400. When the rail 409 is pressed down onto the inclined surfaces 402, the arm grip 401 is forced to rotate around the ball joint 403 and separate away from the base grip 402. This action imparts a compressive force against the flange spring 406, creating a potential energy in the flange spring 406.

Figure 5B:
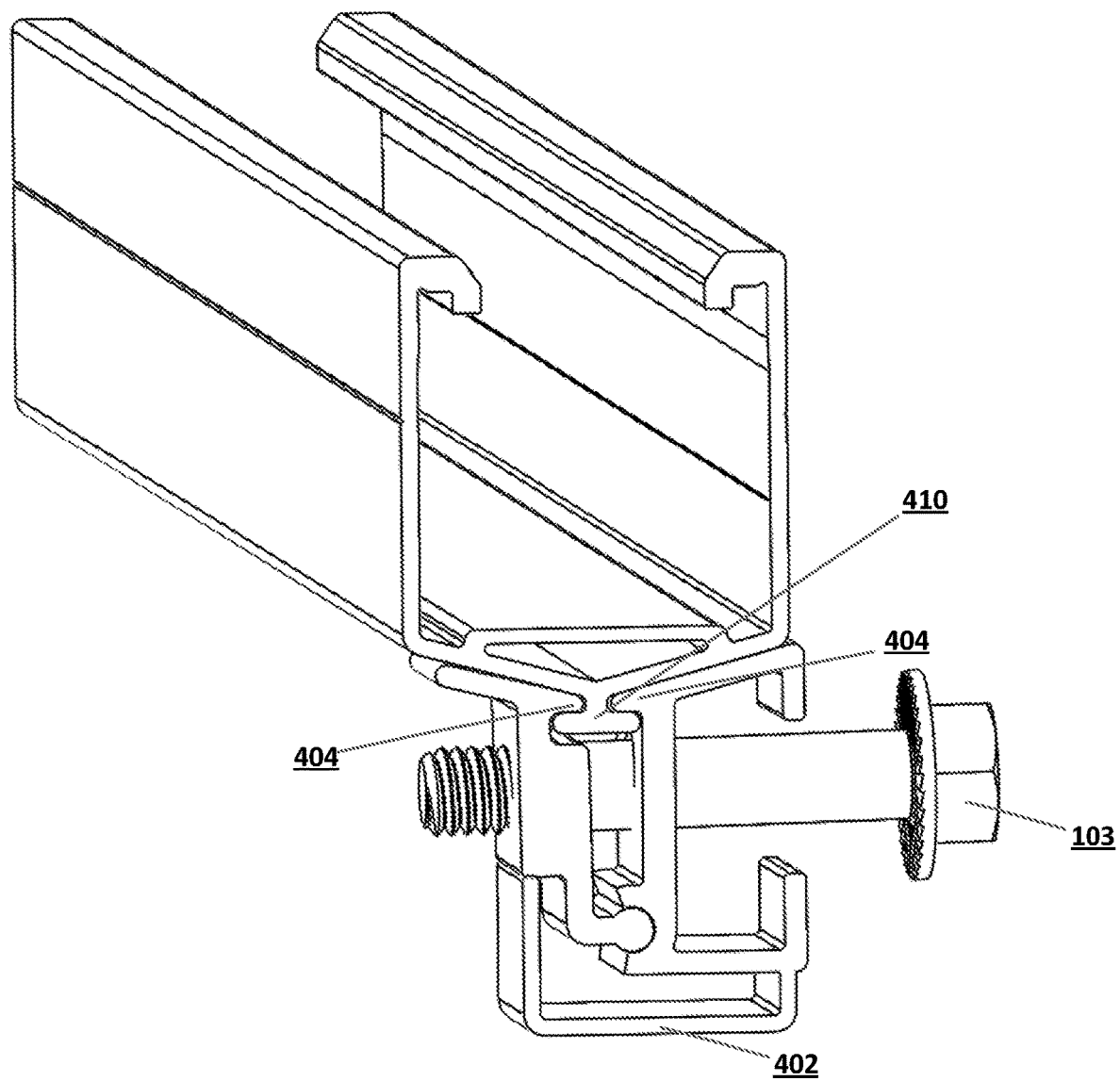
Figure 5C:
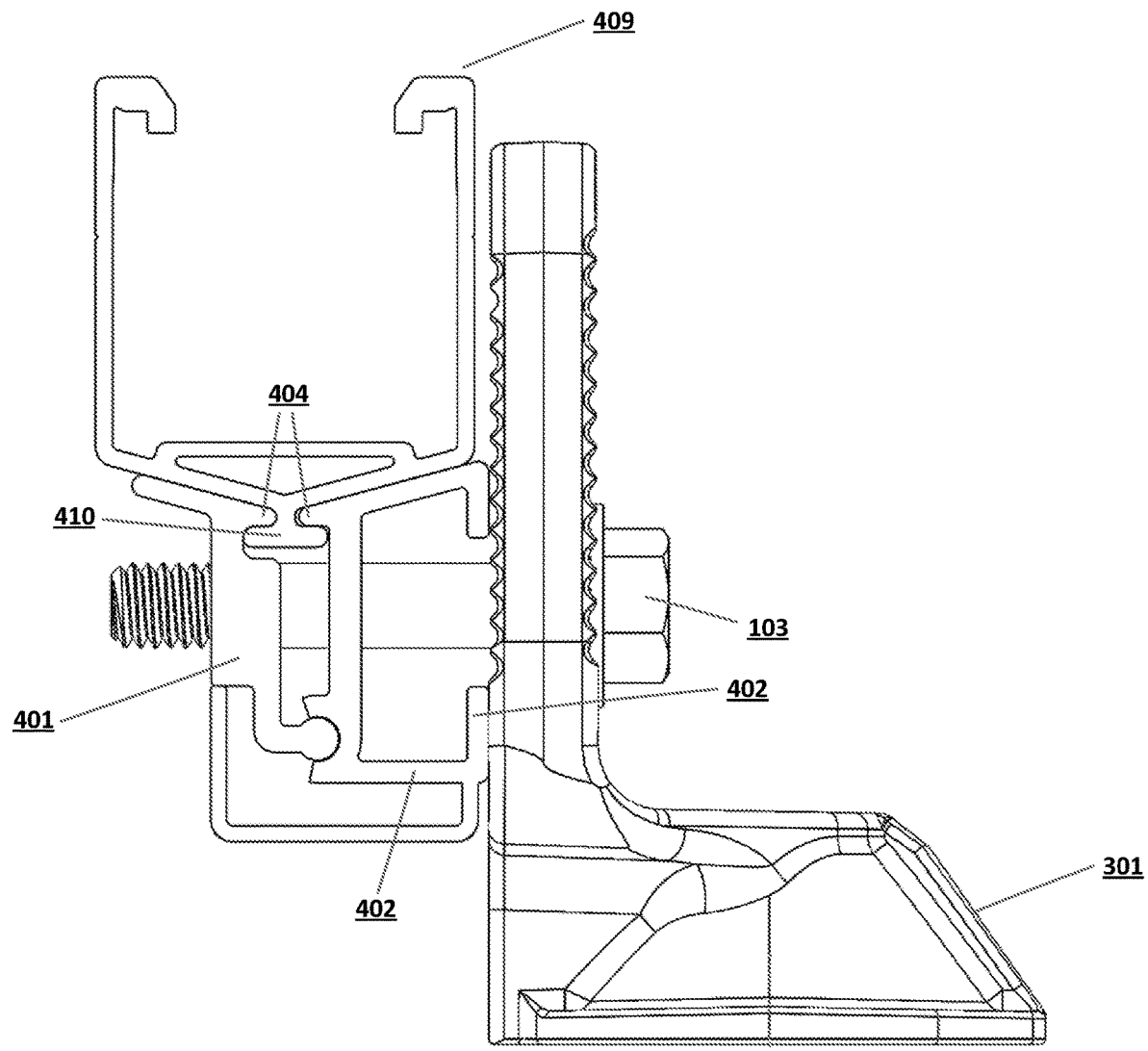
Figure 5D:
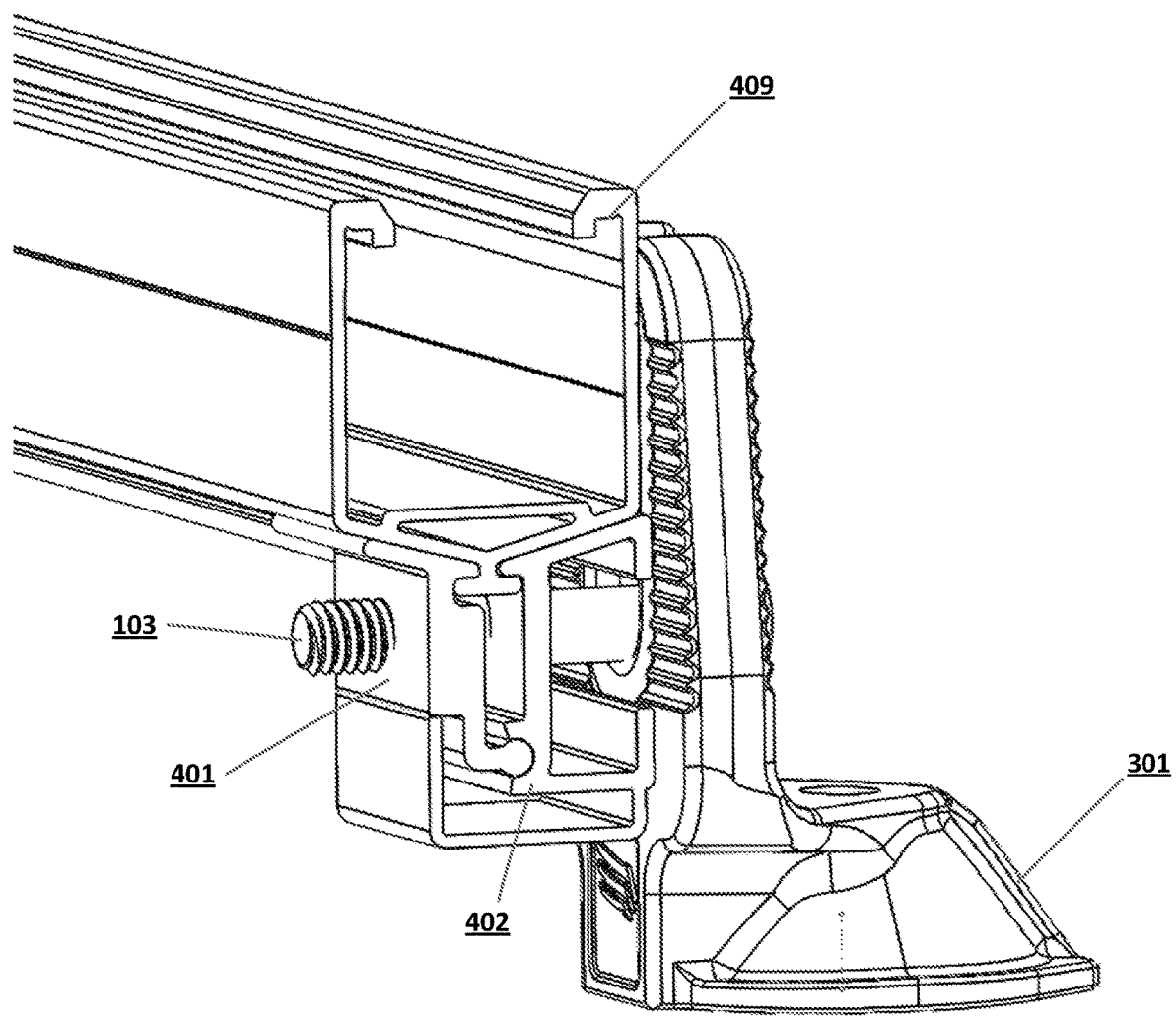

In FIG. 5B, the T-flange 410 has passed below lips 404, and the potential energy stored in the flange spring 406 rotates the arm grip 401 back up so that the lips 404 grip onto the T-flange 410. FIGS. 5C and 5D are end- and isometric views of the rail 409 installed onto the rail clamp 400 and roof attachment 301. Once the rail 409 is installed into the rail clamp 400, the flange spring 406 may impart some force to secure the rail 409 in the rail clamp 400 as the rail 409 is slide through the rail clamp 400 and positioned in its desired location. The fastener 103 threadably engages the threaded aperture in the arm grip 401 to secure the rail 409 to the rail clamp 401 and roof attachment 301.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A clamp apparatus comprising:
a first grip body that includes a first groove;
a second grip body that includes a second groove, wherein alignment of the first groove and the second groove forms a groove pair configured to couple to one or more flanges of a rail;
a fastener extending laterally through at least one of the first grip body and the second grip body; and
a flange spring extending from the first grip body and flexibly engaging with the second grip body at a ball-and-socket joint, wherein the flange spring is configured to flex when the first grip body is moved away from the second grip body along a length of the fastener.

2. The clamp apparatus of claim 1, wherein at least one of the first grip body and the second grip body includes an inclined surface extending from an upper part of the first groove or the second groove.

3. The clamp apparatus of claim 2, wherein the inclined surface allows for pressure-based sliding of the flanges of the rail into the first groove or the second groove.

4. The clamp apparatus of claim 2, wherein the first groove and the second groove are configured to engage the flanges of the rail at a bottom portion of the rail such that the inclined surface extending from the upper part of the first groove or the second groove is parallel to the bottom portion of the rail.

5. The clamp apparatus of claim 1, wherein the fastener is a bolt.

6. The clamp apparatus of claim 1, wherein the fastener further includes a nut at a distal end.

7. The clamp apparatus of claim 1, wherein at least one of the first grip body and the second grip body has a uniform cross-section geometry along an entirety of a length excluding a portion that includes an aperture.

8. The clamp apparatus of claim 1, wherein the first grip body attaches to a roof attachment via the fastener.

9. The clamp apparatus of claim 1, wherein the flange spring has a different thickness than a thickness of a flange extending from the first grip body.

10. A clamp apparatus comprising:
a first grip body that includes a groove having a shape corresponding to a part of a rail;
a second grip body configured to be fastened to the first grip body, wherein the groove of the first grip body is set at a nominal distance from the second grip body when the first grip body and the second grip body are fastened together in a nominal state; and
a flange spring that flexibly engages the first grip body with the second grip body at a ball-and-socket joint when the first grip body and the second grip body are fastened together, wherein the flange spring is configured to flex when the first grip body is moved away from the second grip body into a flexed state, and wherein a flexed distance between the groove of the first grip body and the second grip body while in the flexed state is greater than the nominal distance.

11. A clamp apparatus comprising:
a first grip body that includes a groove having a shape corresponding to a part of a rail;
a second grip body configured to be fastened to the first grip body, wherein the groove of the first grip body is set at a nominal distance from the second grip body when the first grip body and the second grip body are fastened together in a nominal state; and
a flange spring that flexibly engages the first grip body with the second grip body at a tongue joint when the first grip body and the second grip body are fastened together, wherein the flange spring is configured to flex when the first grip body is moved away from the second grip body into a flexed state, and wherein a flexed distance between the groove of the first grip body and the second grip body while in the flexed state is greater than the nominal distance.

12. A clamp apparatus comprising:
a first grip body that includes a first groove;
a second grip body that includes a second groove, wherein alignment of the first groove and the second groove forms a groove pair configured to couple to one or more flanges of a rail;
a fastener extending laterally through at least one of the first grip body and the second grip body; and
a flange spring extending from the first grip body and flexibly engaging with the second grip body at a tongue joint, wherein the flange spring is configured to flex when the first grip body is moved away from the second grip body along a length of the fastener.

* * * * *